(12) United States Patent
Bita et al.

(10) Patent No.: US 8,068,710 B2
(45) Date of Patent: Nov. 29, 2011

(54) DECOUPLED HOLOGRAPHIC FILM AND DIFFUSER

(75) Inventors: Ion Bita, San Jose, CA (US); Gang Xu, Cupertino, CA (US); Lai Wang, Milptas, CA (US); Marek Mienko, San Jose, CA (US); Russell Wayne Gruhlke, Milpitas, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 901 days.

(21) Appl. No.: 11/952,941

(22) Filed: Dec. 7, 2007

(65) Prior Publication Data

US 2009/0147332 A1   Jun. 11, 2009

(51) Int. Cl.
*G02B 6/00* (2006.01)
*G02F 1/1335* (2006.01)
*G02F 1/1333* (2006.01)
*G02B 5/32* (2006.01)

(52) U.S. Cl. ............. 385/133; 359/15; 349/62; 349/122

(58) Field of Classification Search .................. 385/133; 349/63; 359/15, 578, 902
See application file for complete search history.

(56) References Cited

U.S. PATENT DOCUMENTS

| | | |
|---|---|---|
| 2,518,647 A | 8/1950 | Teeple et al. |
| 3,813,265 A | 5/1974 | Marks |
| 4,378,567 A | 3/1983 | Mir |
| 4,832,459 A | 5/1989 | Harper |
| 4,850,682 A | 7/1989 | Gerritsen |
| 4,863,224 A | 9/1989 | Afian |
| 4,915,479 A | 4/1990 | Clarke |
| 4,918,577 A | 4/1990 | Furudate |
| 4,947,291 A | 8/1990 | McDermott |
| 4,961,617 A | 10/1990 | Shahidi |
| 4,974,942 A | 12/1990 | Gross |
| 5,038,224 A | 8/1991 | Martulli et al. |
| 5,042,921 A | 8/1991 | Sato et al. |
| 5,110,370 A | 5/1992 | Vogeli et al. |
| 5,206,747 A | 4/1993 | Wiley et al. |
| 5,226,099 A | 7/1993 | Mignardi et al. |
| 5,261,970 A | 11/1993 | Landis et al. |

(Continued)

FOREIGN PATENT DOCUMENTS

CA   2 490 975   1/2004

(Continued)

OTHER PUBLICATIONS

Official Communication in European Application No. 08153686, dated Jan. 19, 2010.

(Continued)

*Primary Examiner* — Rhonda Peace
(74) *Attorney, Agent, or Firm* — Knobbe, Martens, Olson & Bear LLP

(57) ABSTRACT

In various embodiments described herein, a display device includes a front illumination device that comprises a light guide disposed forward of an array of display elements, such as an array of interferometric modulators, to distribute light across the array of display elements. The light guide may include a turning film to deliver uniform illumination from a light source to the array of display elements. For many portable display applications, the light guide comprises the substrate used in fabricating the display elements. The display device may include additional films as well. The light guide, for example, may include a diffuser and/or an optical isolation layer to further enhance the optical characteristics of the display.

33 Claims, 8 Drawing Sheets

U.S. PATENT DOCUMENTS

| | | |
|---|---|---|
| 5,272,496 A | 12/1993 | Nicolas et al. |
| 5,278,680 A | 1/1994 | Karasawa et al. |
| 5,283,600 A | 2/1994 | Imai |
| 5,289,300 A | 2/1994 | Yamazaki |
| 5,339,179 A | 8/1994 | Rudisill |
| 5,341,242 A | 8/1994 | Gilboa et al. |
| 5,361,190 A | 11/1994 | Roberts et al. |
| 5,387,953 A | 2/1995 | Minoura et al. |
| 5,387,991 A | 2/1995 | Mitsutake et al. |
| 5,446,510 A | 8/1995 | Mitsutake et al. |
| 5,448,659 A | 9/1995 | Tsutsui et al. |
| 5,452,385 A | 9/1995 | Izumi |
| 5,467,417 A | 11/1995 | Nakamura |
| 5,481,385 A | 1/1996 | Zimmerman et al. |
| 5,515,184 A | 5/1996 | Caulfield |
| 5,517,366 A | 5/1996 | Togino |
| 5,555,186 A | 9/1996 | Shioya |
| 5,594,830 A | 1/1997 | Winston |
| 5,601,351 A | 2/1997 | van den Brandt |
| 5,626,408 A | 5/1997 | Heynderickx et al. |
| 5,638,084 A | 6/1997 | Kalt |
| 5,647,036 A | 7/1997 | Deacon |
| 5,650,865 A | 7/1997 | Smith |
| 5,659,410 A | 8/1997 | Koike |
| 5,671,314 A | 9/1997 | Gregory et al. |
| 5,703,667 A | 12/1997 | Ochiai |
| 5,735,590 A | 4/1998 | Kashima |
| 5,749,642 A | 5/1998 | Kimura et al. |
| 5,771,124 A | 6/1998 | Kintz |
| 5,771,321 A | 6/1998 | Stern |
| 5,772,299 A | 6/1998 | Koo et al. |
| 5,782,993 A | 7/1998 | Ponewash |
| 5,783,614 A | 7/1998 | Chen |
| 5,805,117 A | 9/1998 | Mazurek |
| 5,810,464 A | 9/1998 | Ishikawa |
| 5,853,240 A | 12/1998 | Tanaka et al. |
| 5,854,872 A | 12/1998 | Tai |
| 5,892,598 A | 4/1999 | Asakawa et al. |
| 5,914,804 A | 6/1999 | Goossen |
| 5,933,183 A | 8/1999 | Enomoto |
| 5,975,703 A | 11/1999 | Holman |
| 5,982,540 A | 11/1999 | Koike |
| 5,991,073 A | 11/1999 | Woodgate et al. |
| 5,999,239 A | 12/1999 | Larson |
| 6,002,829 A | 12/1999 | Winston |
| 6,008,449 A | 12/1999 | Cole |
| 6,014,192 A | 1/2000 | Lehureau |
| 6,023,373 A | 2/2000 | Inoguchi et al. |
| 6,040,937 A | 3/2000 | Miles |
| 6,048,071 A | 4/2000 | Sawayama |
| 6,049,317 A | 4/2000 | Thompson et al. |
| 6,055,090 A | 4/2000 | Miles |
| 6,073,034 A | 6/2000 | Jacobsen |
| 6,074,069 A | 6/2000 | Chao-Ching |
| 6,091,469 A | 7/2000 | Naito |
| 6,099,134 A | 8/2000 | Taniguchi |
| 6,195,196 B1 | 2/2001 | Kimura |
| 6,196,691 B1 | 3/2001 | Ochiai |
| 6,211,976 B1 | 4/2001 | Popovich |
| 6,213,606 B1 | 4/2001 | Holman |
| 6,232,937 B1 | 5/2001 | Jacobsen |
| 6,259,082 B1 | 7/2001 | Fujimoto et al. |
| 6,282,010 B1 | 8/2001 | Sulzbach |
| 6,322,236 B1 | 11/2001 | Campbell et al. |
| 6,323,415 B1 | 11/2001 | Uematsu et al. |
| 6,356,378 B1 | 3/2002 | Huibers |
| 6,368,885 B1 | 4/2002 | Offenberg et al. |
| 6,375,327 B2 | 4/2002 | Holman |
| 6,377,535 B1 | 4/2002 | Chen et al. |
| 6,381,022 B1 | 4/2002 | Zavracky |
| 6,402,325 B1 | 6/2002 | Yamamoto |
| 6,412,969 B1 | 7/2002 | Torihara |
| 6,421,103 B2 | 7/2002 | Yamaguchi |
| 6,442,124 B1 | 8/2002 | Chung et al. |
| 6,454,452 B1 | 9/2002 | Sasagawa |
| 6,478,432 B1 | 11/2002 | Dyner |
| 6,480,634 B1 | 11/2002 | Corrigan |
| 6,483,613 B1 | 11/2002 | Woodgate et al. |
| 6,520,643 B1 | 2/2003 | Holman et al. |
| 6,522,794 B1 | 2/2003 | Bischel |
| 6,527,410 B2 | 3/2003 | Yamaguchi |
| 6,538,813 B1 | 3/2003 | Magno |
| 6,574,033 B1 | 6/2003 | Chui |
| 6,577,429 B1 | 6/2003 | Kurtz |
| 6,582,095 B1 | 6/2003 | Toyoda |
| 6,592,234 B2 | 7/2003 | Epstein |
| 6,598,987 B1 | 7/2003 | Parikka |
| 6,603,520 B2 | 8/2003 | Umemoto |
| 6,630,968 B1 | 10/2003 | Tsuchihashi et al. |
| 6,631,998 B2 | 10/2003 | Egawa et al. |
| 6,636,322 B1 | 10/2003 | Terashita |
| 6,636,358 B2 | 10/2003 | Umemoto et al. |
| 6,642,913 B1 | 11/2003 | Kimura et al. |
| 6,643,067 B2 | 11/2003 | Miyamae |
| 6,650,455 B2 | 11/2003 | Miles |
| 6,652,109 B2 | 11/2003 | Nakamura |
| 6,669,350 B2 | 12/2003 | Yamashita |
| 6,674,562 B1 | 1/2004 | Miles |
| 6,680,792 B2 | 1/2004 | Miles |
| 6,693,690 B2 | 2/2004 | Umemoto |
| 6,696,140 B2 | 2/2004 | Suzuki |
| 6,709,123 B2 | 3/2004 | Flohr |
| 6,738,194 B1 | 5/2004 | Ramirez |
| 6,742,921 B2 | 6/2004 | Umemoto |
| 6,747,801 B2 | 6/2004 | Umemoto |
| 6,751,023 B2 | 6/2004 | Umemoto et al. |
| 6,760,135 B1 | 7/2004 | Payne |
| 6,761,461 B2 | 7/2004 | Mizutani et al. |
| 6,773,126 B1 | 8/2004 | Hatjasalo |
| 6,774,962 B2 | 8/2004 | Yoon |
| 6,784,948 B2 | 8/2004 | Kawashima et al. |
| 6,794,119 B2 | 9/2004 | Miles |
| 6,798,469 B2 | 9/2004 | Kimura |
| 6,819,380 B2 | 11/2004 | Wen et al. |
| 6,822,745 B2 | 11/2004 | De Groot et al. |
| 6,826,000 B2 | 11/2004 | Lee et al. |
| 6,841,787 B2 | 1/2005 | Almogy |
| 6,852,396 B1 | 2/2005 | Mineo |
| 6,862,141 B2 | 3/2005 | Olczak |
| 6,866,393 B2 | 3/2005 | Yano et al. |
| 6,871,982 B2 | 3/2005 | Holman et al. |
| 6,879,354 B1 | 4/2005 | Sawayama |
| 6,885,377 B2 | 4/2005 | Lim |
| 6,891,530 B2 | 5/2005 | Umemoto |
| 6,917,469 B2 | 7/2005 | Momose |
| 6,930,816 B2 | 8/2005 | Mochizuki |
| 6,964,484 B2 | 11/2005 | Gupta |
| 6,967,779 B2 | 11/2005 | Fadel et al. |
| 6,970,031 B1 | 11/2005 | Martin |
| 6,998,196 B2 | 2/2006 | Rich et al. |
| 7,002,726 B2 | 2/2006 | Patel |
| 7,004,610 B2 | 2/2006 | Yamashita |
| 7,009,754 B2 | 3/2006 | Huibers |
| 7,010,212 B2 | 3/2006 | Emmons et al. |
| 7,012,659 B2 | 3/2006 | Smith et al. |
| 7,018,088 B2 | 3/2006 | Yu |
| 7,019,734 B2 | 3/2006 | Cross et al. |
| 7,025,461 B2 | 4/2006 | Veligdan |
| 7,038,752 B2 | 5/2006 | Lin |
| 7,041,344 B2 | 5/2006 | Kusume et al. |
| 7,042,643 B2 | 5/2006 | Miles |
| 7,046,409 B2 | 5/2006 | Kihara |
| 7,054,045 B2 | 5/2006 | McPheters |
| 7,056,001 B2 | 6/2006 | Chuang |
| 7,064,875 B2 | 6/2006 | Kawano |
| 7,072,093 B2 | 7/2006 | Piehl |
| 7,072,096 B2 | 7/2006 | Holman et al. |
| 7,092,163 B2 | 8/2006 | Bastawros et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,138,984 B1 | 11/2006 | Miles |
| 7,142,347 B2 | 11/2006 | Islam |
| 7,156,546 B2 | 1/2007 | Higashiyama |
| 7,161,730 B2 | 1/2007 | Floyd |
| 7,210,806 B2 | 5/2007 | Holman |

| | | | | | |
|---|---|---|---|---|---|
| 7,218,429 B2 | 5/2007 | Batchko | 2003/0214728 A1 | 11/2003 | Olczak |
| 7,221,418 B2 | 5/2007 | Lee | 2003/0222857 A1 | 12/2003 | Abileah |
| 7,223,010 B2 | 5/2007 | Min | 2003/0231483 A1 | 12/2003 | Higashiyama |
| 7,262,916 B2 | 8/2007 | Kao | 2004/0017599 A1 | 1/2004 | Yang |
| 7,324,248 B2 | 1/2008 | Brotherton-Ratcliffe et al. | 2004/0027315 A1 | 2/2004 | Senda et al. |
| 7,336,329 B2 | 2/2008 | Yoon | 2004/0027339 A1 | 2/2004 | Schulz |
| 7,342,705 B2 | 3/2008 | Chui et al. | 2004/0032401 A1 | 2/2004 | Nakazawa |
| 7,342,709 B2 | 3/2008 | Lin | 2004/0032659 A1 | 2/2004 | Drinkwater |
| 7,352,501 B2 | 4/2008 | Chopra et al. | 2004/0070711 A1 | 4/2004 | Wen |
| 7,355,780 B2 | 4/2008 | Chui | 2004/0080938 A1 | 4/2004 | Holman |
| 7,359,011 B2 | 4/2008 | Hamada | 2004/0109305 A1 | 6/2004 | Chisholm |
| 7,360,899 B2 | 4/2008 | McGuire | 2004/0135494 A1 | 7/2004 | Miyatake |
| 7,366,393 B2 | 4/2008 | Cassarly | 2004/0188150 A1 | 9/2004 | Richard et al. |
| 7,369,294 B2 | 5/2008 | Gally | 2004/0188599 A1 | 9/2004 | Viktorovitch |
| 7,376,308 B2 | 5/2008 | Cheben et al. | 2004/0207995 A1 | 10/2004 | Park |
| 7,380,970 B2 | 6/2008 | Hwang | 2004/0233357 A1 | 11/2004 | Fujimori |
| 7,388,181 B2 | 6/2008 | Han et al. | 2004/0246743 A1 | 12/2004 | Lee |
| 7,400,439 B2 | 7/2008 | Holman | 2005/0002175 A1 | 1/2005 | Matsui et al. |
| 7,417,735 B2 | 8/2008 | Cummings | 2005/0010568 A1 | 1/2005 | Nagatomo |
| 7,417,784 B2 | 8/2008 | Sasagawa | 2005/0024849 A1 | 2/2005 | Parker |
| 7,450,295 B2 | 11/2008 | Tung | 2005/0041175 A1 | 2/2005 | Akiyama |
| 7,456,805 B2 | 11/2008 | Ouderkirk | 2005/0069254 A1 | 3/2005 | Schultheis |
| 7,494,830 B2 | 2/2009 | Liu et al. | 2005/0120553 A1 | 6/2005 | Brown |
| 7,498,621 B2 | 3/2009 | Seitz | 2005/0133761 A1 | 6/2005 | Thielemans |
| 7,508,571 B2 | 3/2009 | Gally | 2005/0141065 A1 | 6/2005 | Masamoto |
| 7,515,336 B2 | 4/2009 | Lippey | 2005/0146897 A1 | 7/2005 | Mimura |
| 7,520,642 B2 | 4/2009 | Holman et al. | 2005/0207016 A1 | 9/2005 | Ando |
| 7,561,323 B2 | 7/2009 | Gally | 2005/0231977 A1 | 10/2005 | Hayakawa |
| 7,564,612 B2 | 7/2009 | Chui | 2005/0259939 A1 | 11/2005 | Rinko |
| 7,603,001 B2 | 10/2009 | Wang | 2005/0286113 A1 | 12/2005 | Miles |
| 7,630,123 B2 | 12/2009 | Kothari | 2006/0001942 A1 | 1/2006 | Chui |
| 7,643,203 B2 * | 1/2010 | Gousev et al. ............... 359/291 | 2006/0002141 A1 | 1/2006 | Ouderkirk |
| 7,688,494 B2 * | 3/2010 | Xu et al. ...................... 359/245 | 2006/0002675 A1 | 1/2006 | Choi |
| 7,706,050 B2 | 4/2010 | Sampsell | 2006/0056166 A1 | 3/2006 | Yeo et al. |
| 7,710,636 B2 | 5/2010 | Chui | 2006/0062016 A1 | 3/2006 | Dejima |
| 7,733,439 B2 * | 6/2010 | Sampsell et al. ................. 349/62 | 2006/0066586 A1 | 3/2006 | Gally |
| 7,750,886 B2 | 7/2010 | Sampsell | 2006/0066935 A1 | 3/2006 | Cummings et al. |
| 7,766,531 B2 | 8/2010 | Anderson et al. | 2006/0067600 A1 | 3/2006 | Gally |
| 7,777,954 B2 | 8/2010 | Gruhlke | 2006/0077123 A1 * | 4/2006 | Gally et al. ..................... 345/32 |
| 7,845,841 B2 | 12/2010 | Sampsell | 2006/0077124 A1 * | 4/2006 | Gally et al. ..................... 345/32 |
| 7,855,827 B2 | 12/2010 | Xu et al. | 2006/0077154 A1 * | 4/2006 | Gally et al. ..................... 345/85 |
| 7,864,395 B2 | 1/2011 | Chui | 2006/0109682 A1 | 5/2006 | Ko et al. |
| 7,872,394 B1 | 1/2011 | Gritters et al. | 2006/0126142 A1 | 6/2006 | Choi |
| 7,876,397 B2 | 1/2011 | Krijn et al. | 2006/0132383 A1 | 6/2006 | Gally |
| 7,907,319 B2 | 3/2011 | Miles | 2006/0181903 A1 | 8/2006 | Okuwaki |
| 7,933,475 B2 | 4/2011 | Wang | 2006/0198013 A1 | 9/2006 | Sampsell |
| 7,944,602 B2 | 5/2011 | Chui | 2006/0209012 A1 | 9/2006 | Hagood, IV |
| 2001/0003504 A1 | 6/2001 | Ishihara | 2006/0209385 A1 | 9/2006 | Liu |
| 2001/0019380 A1 | 9/2001 | Ishihara | 2006/0215958 A1 | 9/2006 | Yeo |
| 2001/0019479 A1 | 9/2001 | Nakabayashi | 2006/0227532 A1 | 10/2006 | Ko et al. |
| 2001/0026001 A1 | 10/2001 | Yagi | 2006/0262562 A1 | 11/2006 | Fukasawa |
| 2001/0030861 A1 | 10/2001 | Oda | 2006/0274400 A1 | 12/2006 | Miles |
| 2001/0049061 A1 | 12/2001 | Nakagaki | 2006/0279558 A1 | 12/2006 | Van Delden et al. |
| 2002/0054258 A1 | 5/2002 | Kondo et al. | 2006/0291769 A1 | 12/2006 | Spoonhower et al. |
| 2002/0075245 A1 | 6/2002 | Kawashima | 2007/0018585 A1 | 1/2007 | Ijzerman et al. |
| 2002/0075555 A1 | 6/2002 | Miles | 2007/0036492 A1 | 2/2007 | Lee |
| 2002/0080465 A1 | 6/2002 | Han | 2007/0070270 A1 | 3/2007 | Yu et al. |
| 2002/0106182 A1 | 8/2002 | Kawashima | 2007/0125415 A1 | 6/2007 | Sachs |
| 2002/0149584 A1 | 10/2002 | Simpson | 2007/0133935 A1 | 6/2007 | Fine |
| 2002/0154256 A1 | 10/2002 | Gotoh | 2007/0134438 A1 | 6/2007 | Fabick |
| 2002/0172039 A1 | 11/2002 | Inditsky | 2007/0171330 A1 | 7/2007 | Hung |
| 2002/0180910 A1 | 12/2002 | Uemoto | 2007/0201234 A1 | 8/2007 | Ottermann |
| 2003/0016930 A1 | 1/2003 | Inditsky | 2007/0229737 A1 | 10/2007 | Takeda |
| 2003/0067760 A1 | 4/2003 | Jagt | 2007/0229936 A1 | 10/2007 | Miles |
| 2003/0081154 A1 | 5/2003 | Coleman | 2007/0236774 A1 * | 10/2007 | Gousev et al. ............... 359/291 |
| 2003/0083429 A1 | 5/2003 | Smith | 2007/0253054 A1 * | 11/2007 | Miles .............................. 359/290 |
| 2003/0086030 A1 | 5/2003 | Taniguchi | 2007/0258123 A1 * | 11/2007 | Xu et al. ........................ 359/245 |
| 2003/0095401 A1 | 5/2003 | Hanson | 2007/0279727 A1 | 12/2007 | Gandhi |
| 2003/0099118 A1 | 5/2003 | Saitoh | 2007/0279935 A1 | 12/2007 | Gardiner |
| 2003/0103177 A1 | 6/2003 | Maeda | 2007/0291362 A1 | 12/2007 | Hill et al. |
| 2003/0151821 A1 | 8/2003 | Favalora | 2008/0030650 A1 | 2/2008 | Kitagawa |
| 2003/0160919 A1 | 8/2003 | Suzuki | 2008/0042154 A1 | 2/2008 | Wano |
| 2003/0161040 A1 | 8/2003 | Ishii | 2008/0084600 A1 * | 4/2008 | Bita et al. ..................... 359/290 |
| 2003/0169385 A1 | 9/2003 | Okuwaki | 2008/0084602 A1 * | 4/2008 | Xu et al. ........................ 359/296 |
| 2003/0184690 A1 | 10/2003 | Ogiwara | 2008/0100900 A1 | 5/2008 | Chui |
| 2003/0184989 A1 | 10/2003 | Matsumoto et al. | 2008/0112039 A1 | 5/2008 | Chui |
| 2003/0193630 A1 | 10/2003 | Chiou | 2008/0137175 A1 | 6/2008 | Lin |
| 2003/0210222 A1 | 11/2003 | Ogiwara et al. | 2008/0151347 A1 | 6/2008 | Chui |
| 2003/0210363 A1 | 11/2003 | Yasukawa | 2008/0180784 A1 * | 7/2008 | Silverstein et al. ........... 359/295 |

| Pub. No. | Date | Inventor | Class |
|---|---|---|---|
| 2008/0180956 A1* | 7/2008 | Gruhlke et al. | 362/331 |
| 2008/0192484 A1 | 8/2008 | Lee | |
| 2008/0239216 A1 | 10/2008 | Miyamoto | |
| 2008/0239449 A1* | 10/2008 | Xu et al. | 359/245 |
| 2008/0266333 A1* | 10/2008 | Silverstein et al. | 345/691 |
| 2008/0267572 A1* | 10/2008 | Sampsell et al. | 385/129 |
| 2009/0059346 A1* | 3/2009 | Xu | 359/291 |
| 2009/0080058 A1* | 3/2009 | Kothari et al. | 359/290 |
| 2009/0086466 A1 | 4/2009 | Sugita | |
| 2009/0096956 A1 | 4/2009 | Uehara et al. | |
| 2009/0097100 A1 | 4/2009 | Gally | |
| 2009/0101623 A1* | 4/2009 | Bita et al. | 216/13 |
| 2009/0103166 A1* | 4/2009 | Khazeni et al. | 359/290 |
| 2009/0126792 A1 | 5/2009 | Gruhlke | |
| 2009/0147535 A1* | 6/2009 | Mienko et al. | 362/615 |
| 2009/0190373 A1 | 7/2009 | Bita et al. | |
| 2009/0199893 A1 | 8/2009 | Bita | |
| 2009/0199900 A1 | 8/2009 | Bita | |
| 2009/0201565 A1 | 8/2009 | Bita et al. | |
| 2009/0201571 A1 | 8/2009 | Gally | |
| 2009/0251752 A1 | 10/2009 | Gruhlke | |
| 2009/0255569 A1 | 10/2009 | Sampsell | |
| 2009/0296193 A1 | 12/2009 | Bita et al. | |
| 2009/0296194 A1 | 12/2009 | Gally | |
| 2009/0310208 A1 | 12/2009 | Wang | |
| 2009/0323144 A1 | 12/2009 | Gruhlke | |
| 2009/0323153 A1 | 12/2009 | Sampsell | |
| 2010/0026727 A1 | 2/2010 | Bita et al. | |
| 2010/0052880 A1 | 3/2010 | Laitinen et al. | |
| 2010/0141557 A1 | 6/2010 | Gruhlke | |
| 2010/0149624 A1 | 6/2010 | Kothari | |
| 2010/0165443 A1 | 7/2010 | Chui | |
| 2010/0214642 A1 | 8/2010 | Miles | |
| 2010/0238529 A1 | 9/2010 | Sampsell et al. | |
| 2010/0302802 A1 | 12/2010 | Bita | |
| 2011/0025727 A1 | 2/2011 | Li | |
| 2011/0199667 A1 | 8/2011 | Wang et al. | |
| 2011/0199669 A1 | 8/2011 | Chui | |

FOREIGN PATENT DOCUMENTS

| | | |
|---|---|---|
| CN | 1272922 | 11/2000 |
| CN | 1286424 | 3/2001 |
| CN | 1381752 | 11/2002 |
| CN | 1447887 | 10/2003 |
| CN | 1643439 A | 7/2005 |
| CN | 1811549 | 8/2006 |
| DE | 34 02 746 | 8/1985 |
| DE | 196 22 748 | 12/1997 |
| DE | 102 28 946 | 1/2004 |
| EP | 0 278 038 | 8/1988 |
| EP | 0 539 099 | 4/1993 |
| EP | 0 590 511 | 4/1994 |
| EP | 0 621 500 | 10/1994 |
| EP | 0 822 441 | 2/1998 |
| EP | 0 879 991 | 11/1998 |
| EP | 0 957 392 | 11/1999 |
| EP | 1 081 633 | 3/2001 |
| EP | 1 116 987 | 7/2001 |
| EP | 1 122 586 | 8/2001 |
| EP | 1 143 270 | 10/2001 |
| EP | 1199512 | 4/2002 |
| EP | 1 251 454 | 10/2002 |
| EP | 1 271 223 | 1/2003 |
| EP | 1 279 892 | 1/2003 |
| EP | 1 296 094 | 3/2003 |
| EP | 1 329 664 | 7/2003 |
| EP | 1 336 876 | 8/2003 |
| EP | 1 347 315 | 9/2003 |
| EP | 1 389 775 | 2/2004 |
| EP | 1 413 543 | 4/2004 |
| EP | 1 437 610 | 7/2004 |
| EP | 1 519 218 | 3/2005 |
| EP | 1 544 537 | 6/2005 |
| EP | 1 577 701 | 9/2005 |
| EP | 1 734 401 | 12/2006 |
| EP | 1 748 305 | 1/2007 |
| EP | 2 068 180 | 6/2009 |
| EP | 2 141 408 | 1/2010 |
| GB | 2 260 203 | 4/1993 |
| GB | 2 278 222 | 11/1994 |
| GB | 2 315 356 | 1/1998 |
| GB | 2 340 281 | 2/2000 |
| JP | 62 009317 | 1/1987 |
| JP | 04 081816 | 3/1992 |
| JP | U04-053220 | 5/1992 |
| JP | 05 281479 | 10/1993 |
| JP | 07-509327 | 10/1995 |
| JP | 08 271874 | 10/1996 |
| JP | 09 022012 | 1/1997 |
| JP | 09-507920 | 8/1997 |
| JP | 09 307140 | 11/1997 |
| JP | 10 500224 | 1/1998 |
| JP | 11 160687 | 6/1999 |
| JP | 11 174234 | 7/1999 |
| JP | 11 184387 | 7/1999 |
| JP | 11 211999 | 8/1999 |
| JP | 11 232919 | 8/1999 |
| JP | 11 326903 | 11/1999 |
| JP | 2000 500245 | 1/2000 |
| JP | 2000 075293 | 3/2000 |
| JP | 2000-089225 | 3/2000 |
| JP | 2000 147262 | 5/2000 |
| JP | 2000 193933 | 7/2000 |
| JP | 2000 514568 | 10/2000 |
| JP | 2000 305074 | 11/2000 |
| JP | 2000 338310 | 12/2000 |
| JP | 2001-297615 | 10/2001 |
| JP | 2001 305312 | 10/2001 |
| JP | 2001 343514 | 12/2001 |
| JP | 2002 090549 | 3/2002 |
| JP | 2002-124113 | 4/2002 |
| JP | 2002-131551 | 5/2002 |
| JP | 2002 174780 | 6/2002 |
| JP | 2002-236290 | 8/2002 |
| JP | 2002 245835 | 8/2002 |
| JP | 2002 287047 | 10/2002 |
| JP | 2002-297044 | 10/2002 |
| JP | 2003 007114 | 1/2003 |
| JP | 2003 057652 | 2/2003 |
| JP | 2003 066451 | 3/2003 |
| JP | 2003-149642 | 5/2003 |
| JP | 2003-149643 | 5/2003 |
| JP | 2003 173713 | 6/2003 |
| JP | 2003-177405 | 6/2003 |
| JP | 2003 188959 | 7/2003 |
| JP | 2003-315694 | 11/2003 |
| JP | 2004-012918 | 1/2004 |
| JP | 2004-062099 | 2/2004 |
| JP | 2004-510185 | 4/2004 |
| JP | 2004-206049 | 7/2004 |
| JP | 2005-316178 | 11/2005 |
| JP | 2006-039056 | 2/2006 |
| JP | 2006-065360 A | 3/2006 |
| JP | 2006 107993 | 4/2006 |
| JP | 2007 027150 | 2/2007 |
| JP | 2007-218540 A | 8/2007 |
| TW | 567388 | 12/2003 |
| WO | WO 94/06871 A1 | 3/1994 |
| WO | WO 95/01584 | 1/1995 |
| WO | WO 95/14256 | 5/1995 |
| WO | WO 95/15582 A1 | 6/1995 |
| WO | WO 95/30924 | 11/1995 |
| WO | WO 97/01240 | 1/1997 |
| WO | WO 97/17628 | 5/1997 |
| WO | WO 97/46908 | 12/1997 |
| WO | WO 98/19201 | 5/1998 |
| WO | WO 98/32047 | 7/1998 |
| WO | WO 98/35182 | 8/1998 |
| WO | WO 99/04296 A | 1/1999 |
| WO | WO 99/63394 | 12/1999 |
| WO | WO 00/50807 | 8/2000 |
| WO | WO 01/57434 | 8/2001 |
| WO | WO 01/81994 | 11/2001 |
| WO | WO 01/84228 | 11/2001 |
| WO | WO 01/84229 | 11/2001 |
| WO | WO 01/90637 | 11/2001 |
| WO | WO 02/06858 | 1/2002 |
| WO | WO 02/071132 | 9/2002 |

| | | |
|---|---|---|
| WO | WO 03/032058 | 4/2003 |
| WO | WO 03/038509 | 5/2003 |
| WO | WO 03/056876 | 7/2003 |
| WO | WO 03062912 | 7/2003 |
| WO | WO 03/075207 | 9/2003 |
| WO | WO 2004/006003 | 1/2004 |
| WO | WO 2004/015489 | 2/2004 |
| WO | WO 2004/027514 | 4/2004 |
| WO | WO 2004/036270 | 4/2004 |
| WO | WO 2004/088372 | 10/2004 |
| WO | WO 2004/114418 A1 | 12/2004 |
| WO | WO 2005/011012 | 2/2005 |
| WO | WO 2005/088367 | 9/2005 |
| WO | WO 2005/111669 | 11/2005 |
| WO | WO 2006/026743 | 3/2006 |
| WO | WO 2007/073203 A1 | 6/2007 |
| WO | WO 2007/094558 | 8/2007 |
| WO | WO 2008/045200 | 4/2008 |
| WO | WO 2008/045207 | 4/2008 |
| WO | WO 2008/045218 | 4/2008 |
| WO | WO 2008/045222 | 4/2008 |
| WO | WO 2008/045311 | 4/2008 |
| WO | WO 2008/045364 | 4/2008 |
| WO | WO 2009/076075 | 6/2009 |

OTHER PUBLICATIONS

International Search Report and Written Opinion in PCT/US2007/020969 (International Publication No. WO 2008/045222) dated Mar. 5, 2008.
International Preliminary Report on Patentability in PCT/US2007/020969 (International Publication No. WO 2008/045222) dated Dec. 23, 2008.
Restriction Requirement in U.S. Appl. No. 11/544,978 dated May 15, 2008.
Response to Restriction Requirement in U.S. Appl. No. 11/544,978 filed Jun. 13, 2008.
Office Action in U.S. Appl. No. 11/544,978 dated Sep. 30, 2008.
Response to Office Action in U.S. Appl. No. 11/544,978, filed Jan. 30, 2009.
Final Office Action in U.S. Appl. No. 11/544,978 dated Apr. 30, 2009.
Request for Continued Examination in U.S. Appl. No. 11/544,978, filed Jul. 29, 2009.
Notice of Allowance in U.S. Appl. No. 11/544,978 dated Nov. 4, 2009.
Comments on Statement of Reasons for Allowance in U.S. Appl. No. 11/544,978, filed Feb. 4, 2010.
Petition to Withdraw from Issue and Request for Continued Examination in U.S. Appl. No. 11/544,978, filed Mar. 19, 2010.
Petition Decision in U.S. Appl. No. 11/544,978 dated Mar. 22, 2010.
Notice of Allowance in U.S. Appl. No. 11/544,978 dated Apr. 23, 2010.
Request for Continued Examination in U.S. Appl. No. 11/544,978, filed Jul. 22, 2010.
Supplement to the Request for Continued Examination in U.S. Appl. No. 11/544,978, filed Jul. 26, 2010.
Notice of Allowance in U.S. Appl. No. 11/544,978 dated Aug. 6, 2010.
Requirement for Restriction/Election in U.S. Appl. No. 11/699,074, dated May 9, 2008.
Response to Restriction/Election in U.S. Appl. No. 11/699,074, dated Jun. 9, 2008.
Notice of Allowance in U.S. Appl. No. 11/699,074, dated Jul. 11, 2008.
Request for Continued Examination (RCE), Amendment, and Information Disclosure Statement in U.S. Appl. No. 11/699,074, dated Oct. 10, 2008.
Notice of Allowance in U.S. Appl. No. 11/699,074, dated Oct. 31, 2008.
Request for Continued Examination (RCE) and Information Disclosure Statement in U.S. Appl. No. 11/699,074, dated Jan. 30, 2009.
Notice of Allowance in U.S. Appl. No. 11/699,074, dated Feb. 26, 2009.
Request for Continued Examination (RCE) and Information Disclosure Statement in U.S. Appl. No. 11/699,074, dated May 22, 2009.
Notice of Allowance in U.S. Appl. No. 11/699,074, dated Jun. 26, 2009.
Request for Continued Examination (RCE) and Information Disclosure Statement in U.S. Appl. No. 11/699,074, dated Nov. 11, 2009.
Supplemental Amendment in U.S. Appl. No. 11/699,074, dated Nov. 24, 2009.
Notice of Allowance in U.S. Appl. No. 11/699,074, dated Dec. 3, 2009.
Request for Continued Examination, Amendment, and Information Disclosure Statement in U.S. Appl. No. 11/699,074, dated Mar. 3, 2010.
Notice of Allowance in U.S. Appl. No. 11/699,074, dated Mar. 11, 2010.
Comments on Statement of Reasons for Allowance in U.S. Appl. No. 11/699,074, dated Jun. 11, 2010.
Preliminary Amendment in U.S. Appl. No. 12/444,142, dated Apr. 2, 2009.
Office Action for European Patent Application No. 07 838 811.3 dated Mar. 19, 2009.
Official Communication in European Application No. 07 838 811, dated Mar. 2, 2010.
Official Communication in Chinese Patent Application No. 200780037248.3, dated Aug. 6, 2010.
Preliminary Amendment in U.S. Appl. No. 12/444,138, dated Jan. 11, 2010.
Extended Search Report in European Application No. 07838811.3, dated Mar. 2, 2010.
Extended Search Report in European Application No. 08152870.5 dated Mar. 3, 2010.
International Search Report and Written Opinion in PCT/US2007/020680 (International Publication No. WO 2008/045200) dated Jul. 1, 2008.
International Preliminary Report of Patentability in PCT/US2007/020680 (International Publication No. WO 2008/045200) dated Apr. 16, 2009.
International Search Report and Written Opinion in International Patent Application No. PCT/US2007/020736 (International Publication No. WO 2008/045207) dated Jul. 14, 2008.
International Preliminary Report on Patentability in International Patent Application No. PCT/US2007/020736 (International Publication No. WO 2008/045207) dated Dec. 30, 2008.
Fan et al., "Channel Drop Filters in Photonic Crystals", Optics Express, vol. 3, No. 1, pp. 4-11, 1998.
Giles et al., "Silicon MEMS Optical Switch Attenuator and its Use in Lightwave Subsystems", IEEE Journal of Selected Topics in Quantum Electronics, vol. 5. No. 1, pp. 18-25, Jan./Feb. 1999.
Imenes et al., "Spectral beam splitting technology for increased conversion efficiency in solar concentrating systems: a review" Solar Energy Materials, Elsevier Science Publishers B.V. Amsterdam, NL, vol. 84, Oct. 1, 2004, pp. 19-69, XP002474546.
Little et al., "Vertically Coupled Microring Rosonator Channel Dropping Filter", IEEE Photonics Technology Letters, vol. 11, No. 2, pp. 215-217, 1999.
Maeda et al., "A study of a high quality front lighting system for reflective full-color liquid crystal displays", Record of Electrical and Communication, Engineering Conversazione Tohoku University, v 78, n 1, 415-16, Sep. 2009, ISSN: 0385-7719.
Magel, "Integrated Optic Devices Using Micromachined Metal Membranes", SPIE vol. 2686, 0-8194-2060-3, pp. 54-63, 1996.
Mehregany, et. al., "MEMS applications in Optical Systems," IEEE/LEOS 1996 Summer Topical Meetings, pp. 75-76, Aug. 1996.
Miles, M., et. al., "Digital Paper™ for reflective displays," Journal of the Society for Information Display, Society for Information Display, San Jose, US, vol. 11, No. 1, pp. 209-215, 2003.
Neal T.D., et. al., "Surface Plasmon enhanced emission from dye doped polymer layers," Optics Express Opt. Soc. America, USA, vol. 13, No. 14, pp. 5522-5527, Jul. 11, 2005.
Oliner, "Radiating Elements and Mutual Coupling," Microwave Scanning Antennas, vol. 2, pp. 131-157 and pp. 190-194, 1966.
Zhou et al., "Waveguide Panel Display Using Electromechanical Spatial Modulators" SID Digest, vol. XXIX, 1998.
International Search Report PCT US2008 085026 Nov. 26, 2008.

European Search Report EP 08153586.4-1234 Qualcomm MEMS Technologies, Inc. Apr. 17, 2009.
International Preliminary Report on Patentability in PCT/US2008/085026 (International Publication No. WO 2009/076075) dated Apr. 12, 2010.
Summons to Attend Oral Proceedings in European Application No. 07 838 811, dated Mar. 18, 2011.
Extended Search Report in European Application No. 11160289.2-2217, dated Aug. 19, 2011.
Extended Search Report in European Application No. 11160294.2-2217, dated Aug. 19, 2011.
Extended Search Report in European Application No. 11160297.5-2217, dated Aug. 19, 2011.
Extended Search Report in European Application No. 11160299.1-2217, dated Aug. 19, 2011.
Extended Search Report in European Application No. 11160304.9-2217, dated Aug. 19, 2011.
Official Communication in Chinese Patent Application No. 200780037248.3, dated Apr. 26, 2011.
Official Communication in Japanese Patent Application No. 2009-531391, dated May 31, 2011.
Official Communication in European Patent Application No. 08152870.5, dated Aug. 11, 2011.
Result of Consultation in European Application No. 07 838 811.3, dated Sep. 27, 2011.

* cited by examiner

|  | Column Output Signals | |
|---|---|---|
|  | $+V_{bias}$ | $-V_{bias}$ |
| Row Output Signals    0 | Stable | Stable |
| $+\Delta V$ | Relax | Actuate |
| $-\Delta V$ | Actuate | Relax |

DECOUPLED HOLOGRAPHIC FILM AND DIFFUSER

BACKGROUND

1. Field

The present invention relates to microelectromechanical systems (MEMS).

2. Description of the Related Art

Microelectromechanical systems (MEMS) include micromechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

Various embodiments described herein comprise a display device comprising a substrate, a plurality of display elements, a turning film, and a cladding. The substrate is configured to guide light therein. The plurality of display elements is supported by the substrate and is rearward of the substrate. The turning film is forward the substrate and is configured to turn light guided in the substrate toward the plurality of display elements. The plurality of scattering features are forward the turning film. The cladding is disposed between the turning film and the scattering features such that light is guided in the turning film and the substrate.

Certain embodiments described herein comprise a display device comprising means for displaying an image and means for supporting the displaying means. The supporting means is disposed forward the displaying means and is configured to guide light therein. The display device further comprises means for turning light guided within the supporting means toward the displaying means. The light turning means is forward of the supporting means. The display device additionally comprises means for scattering light, which is disposed forward of the light turning means. The display device also comprises means for redirecting light from the light turning means back into the light turning means such that light is guided in the light turning means and the supporting means. The light redirecting means is between the light turning means and the light scattering means.

Certain embodiments described herein comprise a method of manufacturing a display device that comprises providing a substrate with plurality of display elements rearward the substrate. The substrate is configured to guide light therein. In this method, a turning film is disposed forward the substrate. The turning film is configured to turn light guided in the substrate and the turning film toward the plurality of display elements. A plurality of scattering features are provided forward the turning film. A cladding is disposed between the turning film and the scattering features such that light is guided in the light turning film and the substrate.

DETAILED DESCRIPTION OF THE CERTAIN PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In various embodiments described herein, the display device includes a front illumination device that comprises a light guide disposed forward of an array of display elements, such as an array of interferometric modulators, to distribute light across the array of display elements. For example, a light guide that includes a turning film may be disposed in front of the array of display elements to deliver uniform illumination from a light source to the array of display elements while allowing for the option of illumination from ambient lighting of the array of display elements. For many portable display applications, however, it is important that the display be very thin. Accordingly, in various embodiments described herein, the light guide comprises the substrate used in fabricating the display elements. The light guide may include additional films as well. The light guide, for example, may include a turning film deposited or laminated on the top or bottom surface of the glass substrate supporting the array of display elements. As a consequence, the overall thickness of the entire display is only slightly increased beyond that of the display elements themselves which are formed on a substrate. Certain embodiments include additional optical layers, such as a diffuser and/or an optical isolation layer to further enhance the optical characteristics of the display.

Figure 1:
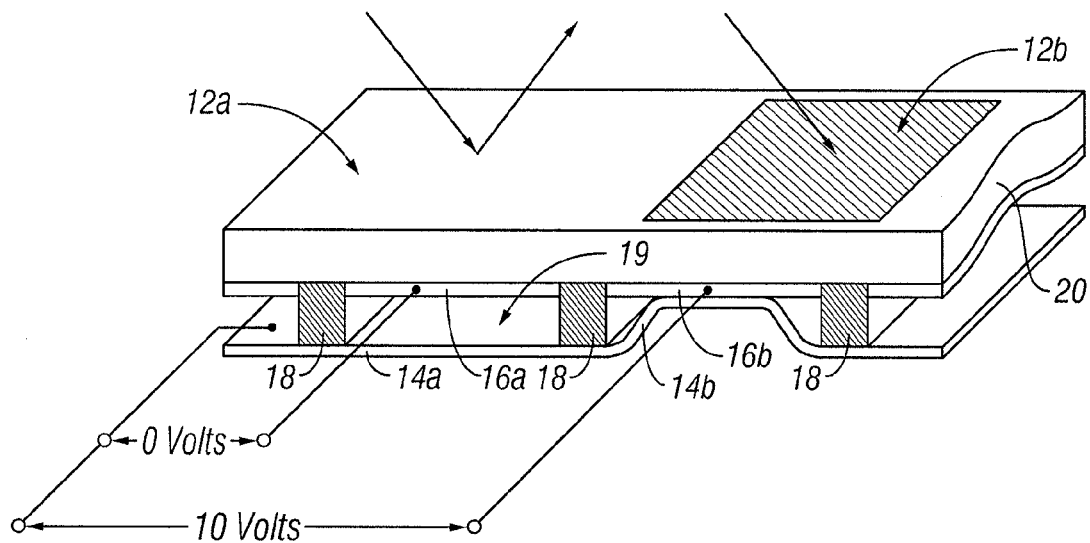
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
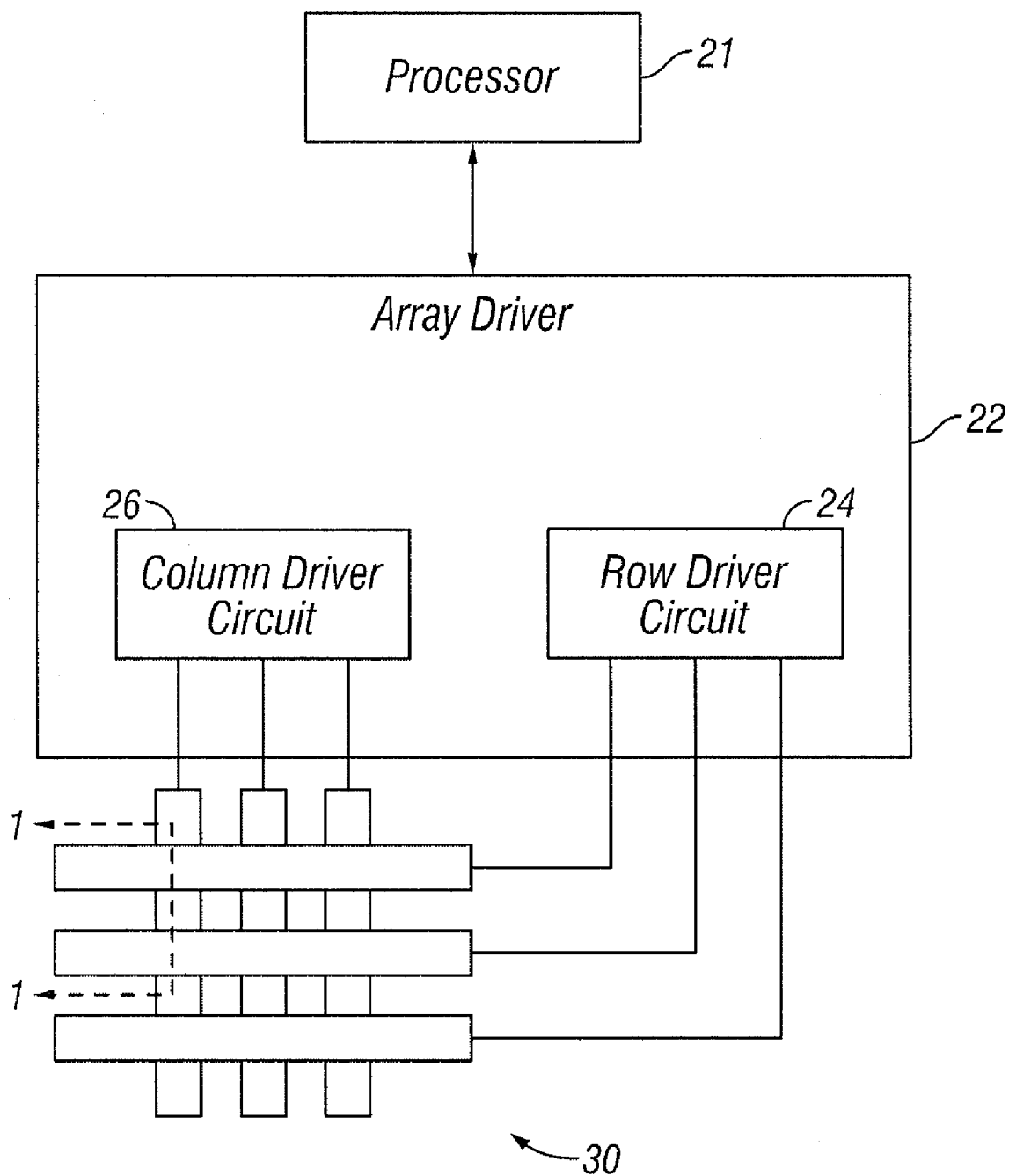
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
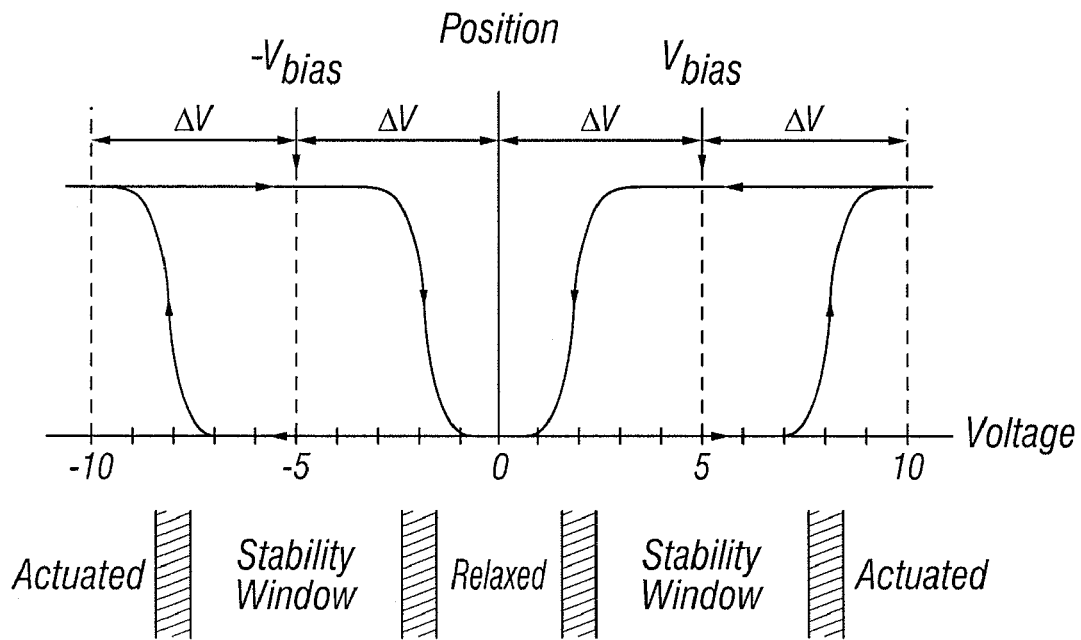
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
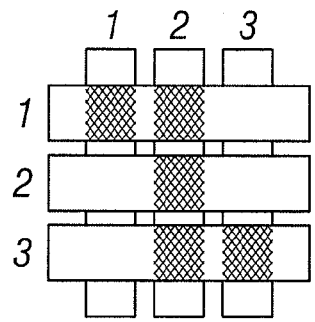
FIG. 5A illustrates one exemplary frame of display data in the 3×3 interferometric modulator display of FIG. 2.
Figure 5B:
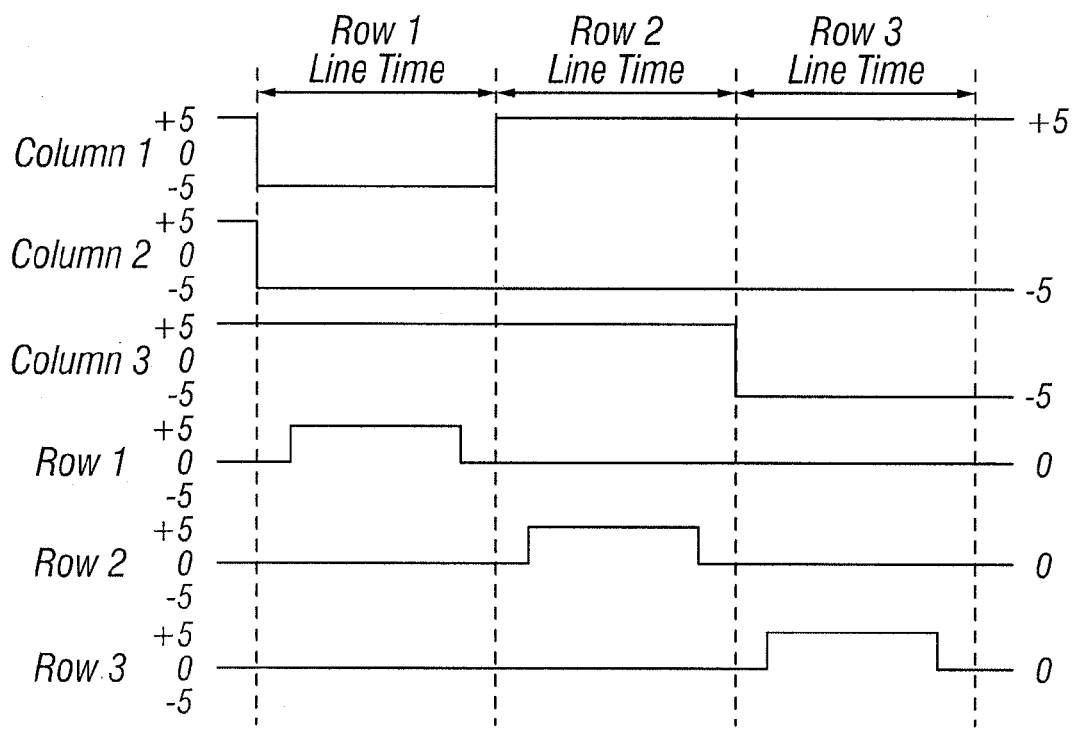
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
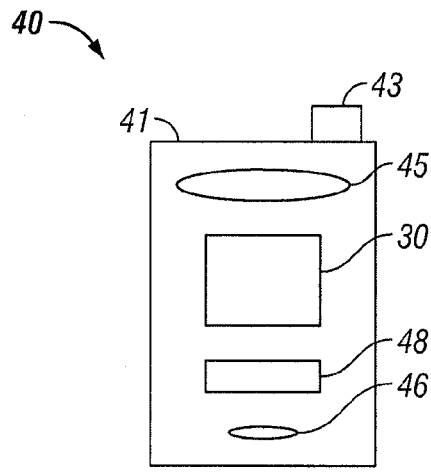
FIGS. 6A and 6B are system block diagrams illustrating an embodiment of a visual display device comprising a plurality of interferometric modulators.
Figure 6B:
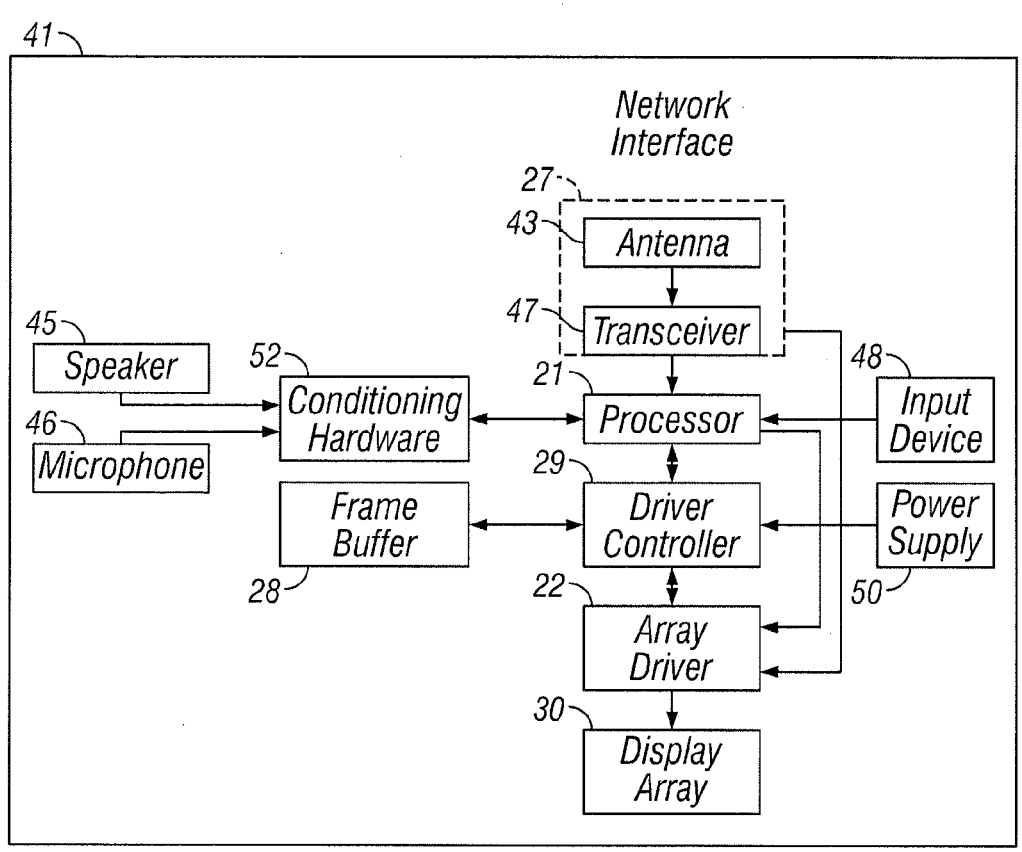

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
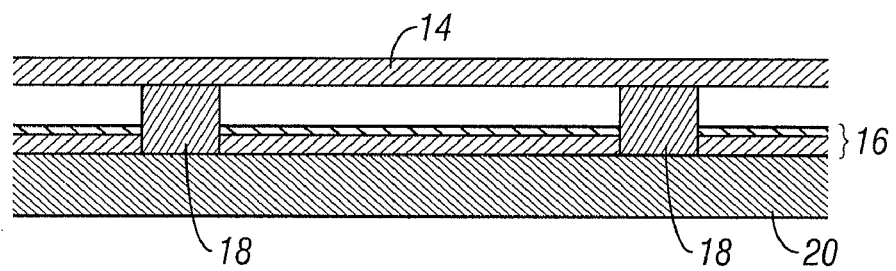
FIG. 7A is a cross section of the device of FIG. 1.
Figure 7B:
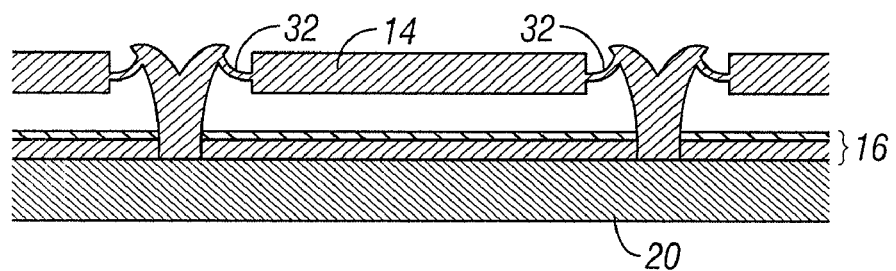
FIG. 7B is a cross section of an alternative embodiment of an interferometric modulator.
Figure 7C:
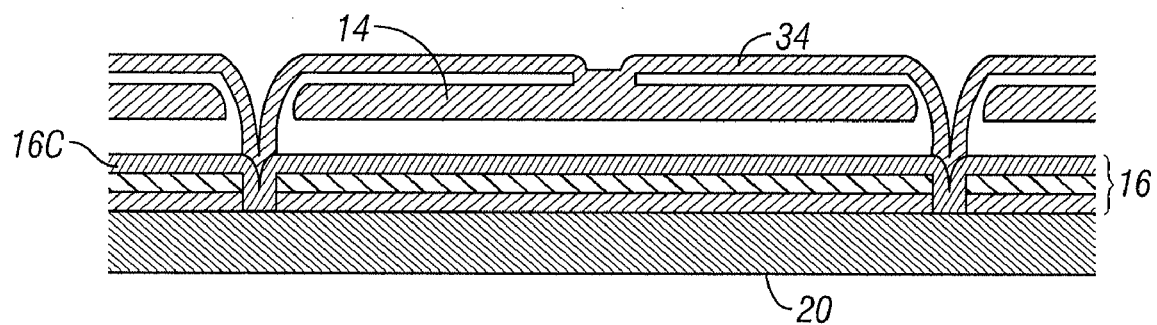
FIG. 7C is a cross section of another alternative embodiment of an interferometric modulator.
Figure 7D:
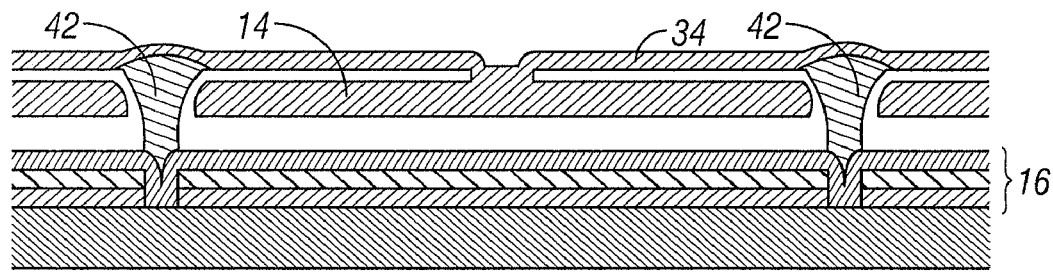
FIG. 7D is a cross section of yet another alternative embodiment of an interferometric modulator.
Figure 7E:
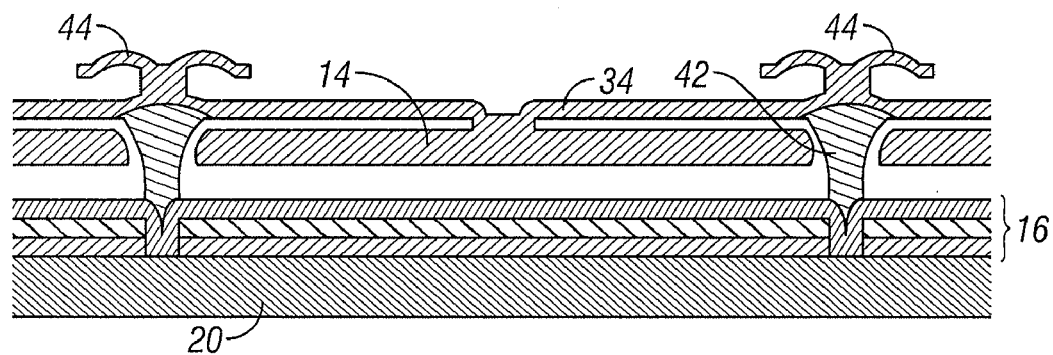
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and it's supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As described above, in certain embodiments the interferometric modulators are reflective and rely on ambient lighting in daylight or well-lit environments. In addition, an artificial source of illumination can be provided for illumination of interferometric modulators in dark ambient environments. The illumination source for interferometric modulator displays may, for example, comprise a front light that uses a light guide to collect light through a narrow rectangular edge of the light guide and redirect it towards the interferometric modulators. In certain embodiments, the light guide may comprise a plastic or glass slab, sheet, plate, or film that is disposed in front of the interferometric modulators. A turning film may be laminated to or deposited on the slab, sheet, or film to redirect light propagating along the light guide toward the display elements. In various designs, such light guides comprise a layer of plastic approximately 1 mm thick. However, for certain applications, the light guide might have a reduced or minimal thickness, for example, of less than about one-half a millimeter, to keep the overall display device thin.

One way to reduce or minimize the overall thickness of the display is to incorporate the turning film on a structural component of the interferometric modulators, such as the substrate on which the interferometric modulators are formed. This substrate may comprise glass. Alternatively, the substrate may comprise plastic or another substantially optically transmissive material. By applying the turning film on a structural component of the interferometric modulators, such as the glass substrate, the light from the artificial light source can be coupled into the glass substrate layer of the interferometric modulators and turned toward the interferometric modulators by the turning film. In such embodiments, the separate glass or plastic slab, sheet, or film is not used and thus the thickness of the overall display device can be significantly reduced.

In certain embodiments, one or more additional optical layers, such as a diffuser or an optical isolation layer may also be disposed on the substrate of the interferometric modulators to otherwise improve the optical performance of the display. For example, a diffuser layer may be provided to scatter light reflected from the interferometric modulators providing a more diffuse look to the display which may otherwise be too mirror-like. Alternatively or in addition, an optical isolation layer may be provided between the light guiding portion of the display and the interferometric modulators to prevent the interferometric modulators from absorbing light propagating through the light guiding portion. As described herein, the geometric arrangement of the turning film, diffuser, and additional optical films on the substrate relative to the interferometric modulator may be selected to enhance the efficiency of the light guiding portion of the display, to further enhance the optical performance of the overall display, or provide other advantages.

The display device may be formed using any of a variety of manufacturing processes known to those skilled in the art to adhere one or more of the optical layers described herein on the glass or plastic substrate of the array of display elements. The glass or plastic substrate comprises a support layer upon which the display elements, such as an array of interferometric modulators, are fabricated. As disclosed herein, the substrate may be further used to support one or more optical layers of the display device.

In one embodiment, a turning film may be deposited or laminated to the substrate. For example, the turning film may be laminated to a top surface of substrate using a pressure sensitive adhesive. Alternatively, the turning film may be deposited on the substrate using techniques known in the art or other techniques yet to be developed. The turning film may be disposed on the opposite surface of the substrate from the array of display elements. In certain embodiments, one or more layers may be disposed between the turning film and the substrate.

A diffuser may also be adhered to the glass substrate. In some embodiments, the diffuser is disposed forward of the turning film such that the turning film is between the diffuser and the substrate. For example, the diffuser may be disposed on the turning film. In some embodiments, one or more layers may be disposed between the diffuser and the turning film. The diffuser may be coated, deposited, laminated, or etched on the turning film or another layer between the diffuser and the turning film using any suitable techniques known in the art or yet to be developed. For example, the diffuser may be spin cast, or alternatively the diffuser may comprise a thin film grown directly on the surface of the turning film or another layer disposed over the turning film. In some embodiments the diffuser comprises adhesive with particulates therein for scattering, for example, a pressure-sensitive adhesive with diffusing features, used to laminate one or more layers or structures to the turning film. In other embodiments, the diffuser may be a surface diffuser sheet or a volume diffuser sheet laminated to the turning film or a layer over the turning film. The diffuser may also comprise a thin film formed on a carrier.

In certain embodiments, an optical isolation layer may be disposed between the glass substrate and the array of display elements. For example, the optical isolation layer may be laminated to or deposited on the surface of the substrate between the glass substrate and the array of display elements. In other embodiments, the optical isolation layer may be laminated to or deposited on a layer over the substrate such that the optical isolation layer is between the glass substrate and the array of display elements.

Moreover, a wide variety of variation is possible. Films, layers, components, and/or elements may be added, removed, or rearranged. Additionally, processing steps may be added, removed, or reordered. Also, although the terms film and layer have been used herein, such terms as used herein include film stacks and multilayers. Such film stacks and multilayers may be adhered to other structures using adhesive or may be formed on other structures using deposition techniques or in other manners. Thus, it is apparent that any one of several geometric arrangements of the multiple optical layers can be produced on the substrate of the display elements using known manufacturing techniques or techniques yet to be developed to provide a thin display device having certain desired optical characteristics.

Figure 8:
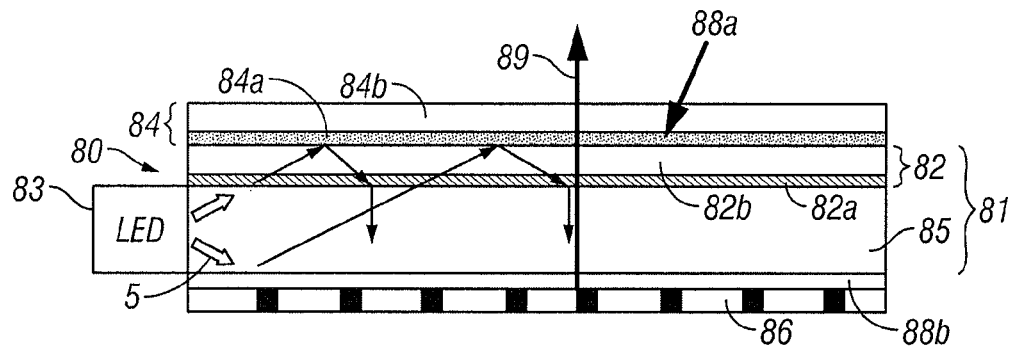
FIG. 8 is a cross section of a portion of a display device comprising a turning film and a diffuser disposed on a substrate on which display elements are formed.

FIG. 8 illustrates one embodiment of a portion of an illumination apparatus 80 in which a turning film 82 is deposited on a top surface of a glass substrate 85 for an array of interferometric modulators 86. In the embodiment shown in FIG. 8, the turning film 82 includes turning features 82a disposed on a carrier 82b. Although in the embodiment shown in FIG. 8, the turning features 82a are rearward of the carrier 82b, in other embodiments the turning features are forward of the carrier. In still other embodiments, the carrier 82b is excluded. The turning film 82 may be adhered to the glass substrate 85 using an adhesive such as a pressure sensitive adhesive in some embodiments.

The glass substrate 85 and turning film 82 form a light guiding region 81 of the illumination apparatus 80 through which light can be guided. However, the overall thickness of the display device due to the light guide 81 is only increased by the addition of the turning film 82, since the glass substrate 85 is a structural component of the interferometric modulators 86. The need for a separate glass or plastic slab or sheet for the light guide 81 has been eliminated by adhering the turning film 82 directly to the glass substrate 85 of the interferometric modulators 86 and using the substrate to guide light. Consequently, the overall thickness of the illumination apparatus 80 is only increased by the thickness of the turning film 82, which is generally between about 50-300 microns. A pressure sensitive adhesive between the turning film 82 and the substrate 85 may be about 25-50 microns in some embodiments.

The embodiment shown in FIG. 8 further comprises a diffuser 84 disposed over the light guide 81 and array of interferometric modulators 86. The diffuser 84 comprises a plurality of diffusing or scatter features 84a disposed on a carrier 84b. Although the plurality of scatter features 84a are shown disposed in a portion of the diffuser rearward of the carrier 84b, in other embodiments the plurality of scatter features 84a may be disposed in a portion of the diffuser forward of the carrier 84b. Alternatively, the carrier may be excluded. The diffuser 84 is positioned forward of and adhered to the turning layer 82 such that the turning layer is between the diffuser and the substrate 85 and interferometric modulators 86.

A light source 83 comprising for example one or more light emitting diodes (LEDs) is disposed with respect to the light guide 81 to inject light therein. In the embodiment shown in FIG. 8, for example, the light 5 from the light source 83 is injected in to an edge of the light guiding portion 81 of the illumination apparatus 80. In some embodiments, the light source 83 comprises a light injection system that transforms light from a point source emitter (e.g., a light emitting diode) into a line source. This light injection system may, for example, comprise a light bar. Other types of light sources may also be used.

Thus, light 5 is injected into the edge of the turning film 82 and/or the glass substrate 85. The light 5 is propagated along the light guiding region 81 at least in part through total internal reflection due to the difference in index of refraction between the turning film 82 and the diffuser 84.

For example, the turning film 82 and/or carrier 82b typically comprises a material such as polycarbonate, acrylic such as polymethylmethacrylate (PMMA), or acrylate copolymers such as poly(styrene-methylmethacrylate) polymers (PS-PMMA, sold under the name of Zylar), or other optically transparent plastics. The index of refraction of polycarbonate is approximately 1.59 and for Zylar is approximately 1.54 for wavelengths in the visible spectrum.

The diffuser 84 may comprise material having a lower refractive index. This material may for example comprise pressure sensitive adhesive having an index of refraction of 1.47. This material is referred to herein as a cladding 88a since this material facilitates guiding of light within the light guide region 81 via total internal reflection. In particular, since the index of refraction of the turning film 82 is greater than that of cladding 88a, light incident on the turning film/cladding interface at an angle greater than the critical angle will be reflected back into the light guiding region 81 and will continue to propagate along the light guiding region 81.

The light 5 may also reflect from the display elements 86 additionally supporting propagation of the light along the light guide 81. The display elements 86, such as interferometric modulators, may however, be absorbing and thus may absorb some of the light incident thereon as is discussed more fully below.

Accordingly, the display device may further comprise an optical isolation layer 88b disposed between the glass substrate 85 and the array of interferometric modulators 86. Typically, the interferometric modulators 86 are absorptive structures, for light rays guided at an angle of 45-90 degrees measured from the normal to the display elements. Thus, some of the light propagating through the light guiding portion 81 and incident on the interferometric modulators 86 at an oblique angle may be substantially absorbed by the interferometric modulators 86 after a sufficient number of reflections. In order to reduce, minimize, or prevent this loss of light due to absorption, the optical isolation layer 88b may be disposed between the glass substrate 85 and the interferometric modulators 86. The optical isolation layer 88b, as discussed in more detail below, advantageously has an index of refraction substantially lower than the glass substrate 85, such that light traveling through the light guiding potion 81 and striking the glass/optical isolation film interface at an oblique or grazing angle, for example, greater than the critical angle (e.g., greater than 40° or 50°), will be totally internally reflected back into the light guiding portion 81 of the illumination apparatus 80. In various embodiments, the optical isolation layer comprises silicon dioxide, or fluorinated silicon dioxide. Other materials may be employed as well.

In certain embodiments, the indices of refraction of the multiple optical layers comprising the light guiding portion 81, here the turning film 82 and the glass substrate 85, are advantageously close such that light may be transmitted through the multiple optical layers without being substantially reflected or refracted. The substrate 85 may for example have an index of refraction of 1.52. As described above, the substrate 85 may comprise glass or polymeric material in certain embodiments.

In some embodiments, the refractive index of substrate 85 is lower than that of turning film 82. With such a design, some portion of the light incident at large incident angles (e.g. 70° to 90°) on the interface between substrate 85 and the turning features 82a would be reflected back such that light is guided to the end of the turning film 82 opposite the light source 83. Such a configuration may improve the uniformity of the distribution of light directed onto the display elements 86, for example, when the efficiency of the turning film 82 is high.

In certain embodiments, the light guiding portion 81 or other portions of the illumination apparatus 80 further comprises an adhesive such as pressure sensitive adhesive (PSA) layer. The PSA layer may be used to adhere the diffuser layer 84, the turning film 82, and the glass substrate 85. In various embodiments, the PSA layers are transparent with an index of refraction of between about 1.47-1.53 such that the index of refraction matches the index of refraction of glass substrate 85, generally about 1.52 for wavelengths in the visible spectrum. For example, in certain embodiments, the index of refraction of the PSA layers is about 1.53. Matching the indices of refraction of the PSA layers with the glass substrate 85 and the turning film 82 is advantageous in preventing unwanted reflections originating from the ambient or from the light source of the light guide at the interfaces between the substrate 85 and turning film 82. Such adhesive may be used elsewhere as well. Alternative approaches to adhering the layers together may also be used.

The plurality of turning features 82a in the turning film 82 turn light normally guided in the light guide 81 such that the light is redirected towards the display elements 86 and such that the propagation direction of the turned light forms an angle smaller than 45 degrees from the normal to the surface of the display elements. Accordingly, light is redirected through the thickness of the light guiding portion 81 substantially normal to the light guide and the array of display elements 86 and is transmitted to the interferometric modulators 86 possibly at normal incidence or substantially close thereto. In certain embodiments, the turning features 82a may comprise a plurality of surface features or volume features. In some embodiments, the turning film 82 comprises a diffractive optical element and the turning features comprise diffractive features extending across the width of the turning film 82. The diffractive optical element may comprise volume or surface features, extending across the width of the turning film 82. In certain embodiments, the turning film 82 comprises a hologram and the turning features 82a comprise holographic features. The hologram may comprise holographic volume or surface features, extending across the width of the turning film 82. The holographic film may be disposed on a plastic carrier.

Alternatively, the turning features 82a may comprise a plurality of microprisms extending along the width of the turning film 82. The microprisms may be configured to receive light 5 propagating along the width of the turning film 82 and turn the light 5 through a large angle, usually between about 70-90°. The prismatic microstructures may comprise two or more turning facets angled with respect to one another for reflecting the light via total internal reflection and causing the light to be turned toward the array of display elements 86 at normal incidence or near normal incident thereto. The prismatic microstructures may be included in a film disposed on a carrier. Note that the size, shape, and separation of the turning features may vary. A wide variety of other types of turning films, diffractive, holographic, prismatic, or otherwise are possible. Accordingly, different sizes, shapes, configuration, and arrangements may be employed.

After being turned by the turning features 82a, the light 5 is transmitted through the thickness of the light guiding region 81 toward the interferometric modulators 86 where it may be modulated and reflected back through the light guiding portion 81 towards a viewer disposed in front of the display device to provide an image on the display device. This reflected light is schematically represented by an arrow 89 in FIG. 8.

In various embodiments, light propagating through the light guiding portion 81 at steep angles (closer to the display elements' normal), such as light turned substantially normal to the light guiding portion 81 by the turning film 82, or ambient light, will be transmitted through the interfaces between the layers with low reflection. This normally incident light or near normally incident light preferably looses less than about 0.5% of its power or flux, and more preferably looses less than about 0.1% of its power or flux.

As described above, in alternative embodiments, the turning film 82 and the diffuser 84 need not include carriers 82b, 84b. For example, the diffuser 84 may comprise a transparent adhesive or other material with light diffusing or light scattering features such as particulates interspersed therein to provide the light diffusing characteristics. This design may further decrease the thickness of the overall display illumination apparatus 80 by removing the need for a carrier 84b, which may cause the diffuser layer 84 to be between about 25-100 microns thick in some embodiments.

Figure 9:
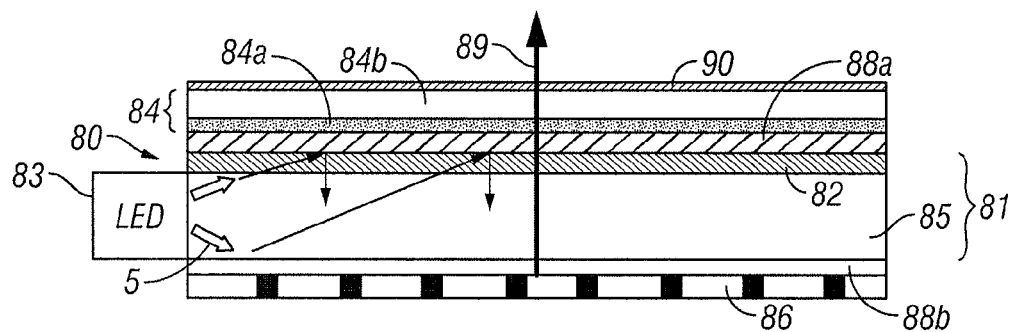
FIG. 9 is a cross section of a portion of a display device further comprising an anti-reflective coating.

FIG. 9 shows another embodiment of an illumination apparatus 80 of a display device. In this embodiment, an anti-reflective layer 90 has been disposed forward of the diffuser 84. In this particular embodiment, the anti-reflective layer 90 is disposed on the carrier 84b which supports the diffusing layer 84a. Other embodiments can be configured differently. For example, one or more layers may be disposed between the diffuser 84 and the anti-reflective layer 90. Also, the diffuser 84 may be constructed differently. In some embodiments, for example, as described above, the carrier 84b may be excluded.

In various embodiments, the anti-reflective layer 90 reduces reflection of ambient light from the illumination apparatus 80. Such reflected ambient light can decrease the contrast of the device as the viewer sees the reflected ambient which is un-modulated light together with the modulated light from reflected from the array of light modulators 86.

The anti-reflective layer 90 may comprise one or more layers that reduce reflection. The anti-reflective layer 90 may for example be a transparent dielectric that increases index matching between the illumination apparatus 80 (e.g., the diffuser 84) and ambient (or a layer forward the anti-reflective layer). In some embodiments, the anti-reflective layer 90 comprises a multilayer stack such as an interference stack like a quarter-wave stack. A variety of anti-reflective layers are possible.

FIG. 9 also illustrates other possible variations in the design of the illumination apparatus 80. A cladding 88a is shown disposed between the turning film 82 and the diffuser 84. For example, this cladding 88a may, for example, comprise a material having a lower refractive index than that of the turning film 82 and possibly of the substrate 85. The cladding 88a may therefore assist in guiding light within the light propagation region 81 via total internal reflection. With the lower indexed cladding 88a, the refractive index of diffuser 84a is not limited to being lower than that of turning film 82. In other embodiments, the diffuser 84 may form part of the cladding 88a as discussed above with regard to FIG. 8. Other variations are also possible.

In the embodiment depicted in FIG. 9, the turning film 82 is attached to the cladding 88a. A separate carrier 82b for supporting the turning features 82a such as shown in FIG. 8 is not included in FIG. 9 to illustrate variations in possible designs. The substrate 85 or cladding 88a may provide structural support for the turning film 82 or the turning film may be sufficiently rigid itself. In some embodiments, the turning film 82 comprises a prismatic film. In other embodiments, the turning film 82 comprises a diffractive or holographic layer. Still other variations are possible.

Figure 10:
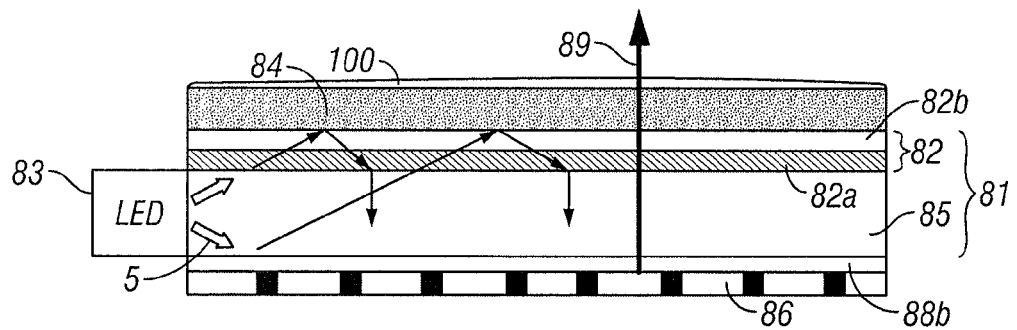
FIG. 10 is a cross section of a portion of a display device further comprising a lens or a touch panel.

FIG. 10 shows another embodiment of an illumination apparatus 80 of a display device. In this embodiment, a cover lens or touch panel 100 has been disposed forward of the diffuser 84. In other embodiments, the cover lens or touch panel 100 may instead comprise a cover plate that is planar. In this particular embodiment, the cover lens or touch panel 100 is disposed on the diffuser 84. Other embodiments can be configured differently. For example, one or more layers may be disposed between the diffuser 84 and the cover lens or touch panel 100.

The cover lens 100 may comprise a positive or negative power optical element. The cover lens 100 may comprise a refractive lens or a diffractive (e.g. holographic) lens. In some embodiments, a plurality of lenslets may be disposed forward of the diffuser 84.

The touch panel 100 may comprise a wide variety of touch panels that permit a user to touch portions of the illumination apparatus 80 or display device to enter data, select options, or control the display device. Touch panels 100 yet to be developed may also be used.

FIG. 10 also illustrates other possible variations in the design of the illumination apparatus 80. For example, in the embodiment depicted in FIG. 10, the diffuser 84 is attached to the cover lens or touch panel 100 and carrier 82b for the turning film 82. A separate carrier 84b such as shown in FIG. 8 and FIG. 9 is not included in FIG. 10 to illustrate variations in possible designs. The cover lens or touch panel 100 and carrier 82b for the turning film 82 may provide structural support for the diffuser 84 or the diffuser may be sufficiently rigid itself. In some embodiments, the diffuser 84 comprises an adhesive, for example, adhering the cover lens or touch panel 100 to the turning film 82. The adhesive may include diffusing features or scatter features such as particulates therein to diffuse the light. The diffuser 84 may also comprise a gel in some embodiments. The gel may include diffusing features or scatter features such as particulates therein to diffuse the light. The gel may provide optical coupling between the cover lens or touch panel 100 and the turning film 82 and turning features 82a. Still other variations are possible. In various embodiments, scatter features are disposed in a material at least a portion of which is a cladding for the light guide 81. In such embodiments, at least a portion of the matrix material may be disposed between the scattering feature and the light guide 81. Accordingly, the scattering features may be disposed in the cladding and at least a portion of the cladding is disposed between the scattering features and the turning film.

FIG. 10 illustrates that a wide variety of components may be added to the illumination apparatus 80 and/or the display device. In addition anti-reflective layers 90, touch screens and/or lens 100, other components may also be included.

A wide variety of other alternative configurations are also possible. For example, components (e.g., layers) may be added, removed, or rearranged. Similarly, processing and method steps may be added, removed, or reordered. Also, although the terms film and layer have been used herein, such terms as used herein include film stacks and multilayers. Such film stacks and multilayers may be adhered to other structures using adhesive or may be formed on other structures using deposition or in other manners.

Accordingly, although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A display device comprising:
   a plurality of display elements;
   a light guide configured to propagate light therein by total internal reflection, said light guide comprising a turning film, said turning film comprising a holographic layer configured to turn said light propagating within the light guide by total internal reflection toward said plurality of display elements;
   a plurality of scattering features forward said turning film; and
   a cladding comprising material disposed between said turning film and said scattering features such that light is guided in said turning film.

2. The display device of claim 1, wherein said plurality of display elements comprises electromechanical system structures.

3. The display device of claim 2, wherein said electromechanical system structures comprise first and second reflective surfaces, at least one of said first and second reflective surfaces being movable with respect to the other.

4. The display device of claim 3, wherein said plurality of display elements comprises interferometric modulators.

5. The display device of claim 1, wherein said holographic layer is disposed on a plastic carrier.

6. The display device of claim 1, wherein said scattering features are included in said cladding.

7. The display device of claim 1, wherein said cladding is disposed between a diffusing layer comprising said scattering features and said turning film.

8. The display device of claim 1, wherein said cladding comprises low index material having sufficiently low refractive index such that said light is guided in said light turning film.

9. The display device of claim 8, wherein said low index material has an index of refraction less than said turning film.

10. The display device of claim 8, wherein the low index material has an index of refraction less than 1.48.

11. The display device of claim 8, wherein said scattering features comprise diffusing particulates disposed in said low index material.

12. The display device of claim 11, wherein said low index material comprises adhesive.

13. The display device of claim 1, wherein said scattering features are disposed in a diffuser layer.

14. The display device of claim 13, wherein said diffuser layer is directly adjacent said turning film or directly adhered to said turning film with an adhesive.

15. The display device of claim 13, wherein said turning film is disposed on a plastic carrier and said plastic carrier is directly adjacent said diffuser layer.

16. The display device of claim 13, wherein said turning film and said diffuser layer are disposed on plastic carriers and said plastic carriers are directly adjacent or directly adhered to each other by an adhesive.

17. The display device of claim 13, wherein said diffuser layer is disposed on a plastic carrier and said plastic carrier is directly adjacent said turning film or directly adhered to said turning film with an adhesive.

18. The display device of claim 13, wherein said diffuser layer has a lower index of refraction than said holographic layer.

19. The display device of claim 13, wherein said diffuser layer comprises a gel.

20. The display device of claim 1, further comprising an anti-reflective coating, said anti-reflective coating forward a diffusing layer comprising said scattering features.

21. The display of claim 1, further comprising:
a processor that is in electrical communication with at least one of said plurality of display elements, said processor being configured to process image data; and
a memory device in electrical communication with said processor.

22. The display of claim 21, further comprising:
a driver circuit configured to send at least one signal to said at least one of said plurality of display elements.

23. The display of claim 22, further comprising:
a controller configured to send at least a portion of said image data to said driver circuit.

24. The display of claim 21, further comprising:
an image source module configured to send said image data to said processor.

25. The display of claim 24, wherein said image source module comprises at least one of a receiver, transceiver, and transmitter.

26. The display of claim 21, further comprising:
an input device configured to receive input data and to communicate said input data to said processor.

27. A display device comprising:
means for displaying an image;
means for turning light comprising a holographic means, said light turning means configured to propagate light in the holographic means and to turn light toward the displaying means;
means for scattering light disposed forward of said light turning means; and
means for redirecting light from said light turning means back into said light turning means such that light is guided in said light turning means, said light redirecting means comprising material being between said light turning means and said light scattering means.

28. The display device of claim 27, wherein said displaying means comprises a plurality of display elements.

29. The display device of claim 28, wherein said plurality of display elements comprise interferometric modulators.

30. The display device of claim 27, wherein said light scattering means comprises scattering features.

31. The display device of claim 27, wherein said light turning means comprises a holographic layer or a prismatic layer.

32. The display device of claim 27, wherein said light redirecting means comprises cladding.

33. A method of manufacturing a display device comprising:
providing a plurality of display elements;
providing a light guide configured to propagate light therein by total internal reflection, said light guide comprising a turning film, said turning film comprising a holographic layer configured to turn said light propagating within the light guide by total internal reflection toward said plurality of display elements;
providing a plurality of scattering features forward said turning film; and
disposing a cladding comprising material between said turning film and said scattering features such that light is guided in said turning film.

* * * * *

UNITED STATES PATENT AND TRADEMARK OFFICE
CERTIFICATE OF CORRECTION

| | | |
|---|---|---|
| PATENT NO. | : 8,068,710 B2 | Page 1 of 1 |
| APPLICATION NO. | : 11/952941 | |
| DATED | : November 29, 2011 | |
| INVENTOR(S) | : Bita et al. | |

It is certified that error appears in the above-identified patent and that said Letters Patent is hereby corrected as shown below:

Title page, item 75, line 2, change "Milptas," to --Milpitas,--.

On page 4, line 11, column 1, under U.S. Patent Documents, change "Gally" to --Gally et al.--.

On page 5, line 51, column 2, under Other Publications, change "Rosonator" to --Resonator--.

In column 6, line 2, change "respectively" to --respectively.--.

In column 17, line 42, claim 21, insert --device-- after "display".

In column 17, line 48, claim 22, insert --device-- after "display".

In column 18, line 1, claim 23, insert --device-- after "display".

In column 18, line 4, claim 24, insert --device-- after "display".

In column 18, line 7, claim 25, insert --device-- after "display".

In column 18, line 10, claim 26, insert --device-- after "display".

Signed and Sealed this
First Day of May, 2012

David J. Kappos
*Director of the United States Patent and Trademark Office*